United States Patent [19]

Gurwicz

[11] 4,333,134
[45] Jun. 1, 1982

[54] CONVERTERS

[75] Inventor: David Gurwicz, Gateshead, England

[73] Assignee: Chloride Group Limited, London, England

[21] Appl. No.: 124,078

[22] Filed: Feb. 25, 1980

[30] Foreign Application Priority Data

Feb. 28, 1979 [GB] United Kingdom ................ 7907036

[51] Int. Cl.³ .......................................... H02M 3/335
[52] U.S. Cl. ...................................... 363/17; 363/98; 363/132
[58] Field of Search ...................... 363/16, 17, 24–26, 363/75, 96–98, 131–134; 323/9, 24, 901, 908, 310; 180/65 R

[56] References Cited

U.S. PATENT DOCUMENTS

| 2,526,053 | 10/1950 | Uhlmann | 363/120 |
| 3,099,789 | 7/1963 | Perrins | 323/9 |
| 3,800,210 | 3/1974 | Caussin | 363/40 |
| 3,818,313 | 6/1974 | Rosenstein et al. | 363/131 |
| 3,842,339 | 10/1974 | Hoffman | 363/136 |
| 3,904,947 | 9/1975 | Crews | 180/65 R |
| 4,094,377 | 6/1978 | Biggs | 180/65 R |
| 4,199,037 | 4/1980 | White | 180/65 R |
| 4,199,807 | 4/1980 | Crowe et al. | 363/98 |
| 4,227,243 | 10/1980 | Gurwicz et al. | 363/132 |

FOREIGN PATENT DOCUMENTS

| 1385260 | 3/1964 | France . |
| 1225695 | 3/1971 | United Kingdom . |
| 1346310 | 2/1974 | United Kingdom . |

OTHER PUBLICATIONS

Seelig, "Thyristor Inverters with Saturable Reactors for Higher Frequency Applications", IEEE Transactions on Magnetics, vol. Mag. 2, No. 3, Sep. 1966, pp. 638–643.

Primary Examiner—William M. Shoop
Assistant Examiner—Peter S. Wong
Attorney, Agent, or Firm—Oblon, Fisher, Spivak, McClelland & Maier

[57] ABSTRACT

A high frequency converter of push-pull form comprises a center tapped D.C. input supply 16, 17, 18, two solid state switching devices (20, 21) connected in series across the D.C. input terminals, a load circuit including a supersonic frequency transformer 30 and an output rectifier 35, and an oscillatory circuit including at least one capacitor 40 and a parallel inductor 34 connected in parallel with the primary winding 37 of the transformer between the center tapping 19 of the supply and the junction 25 of the switching devices. The switching devices are synchronized to the oscillation of the oscillatory circuit to allow the circuit to oscillate freely for part of a cycle to transfer energy from the inductor 34 to the capacitor 40 to charge the latter to a certain condition in which the voltage across the parallel inductor is substantial and that across the switching device is negligible and only then connect the parallel inductor across the D.C. input terminals whereupon the parallel inductor receives and stores energy from the said supply. Means such as a saturable reactor 33 are connected in series in the load circuit to restrict load current to a low value during a part of the cycle in which the capacitor receives energy from the parallel inductor and until the capacitor is charged to the said condition and the switching means has connected the load circuit across the supply.

15 Claims, 7 Drawing Figures

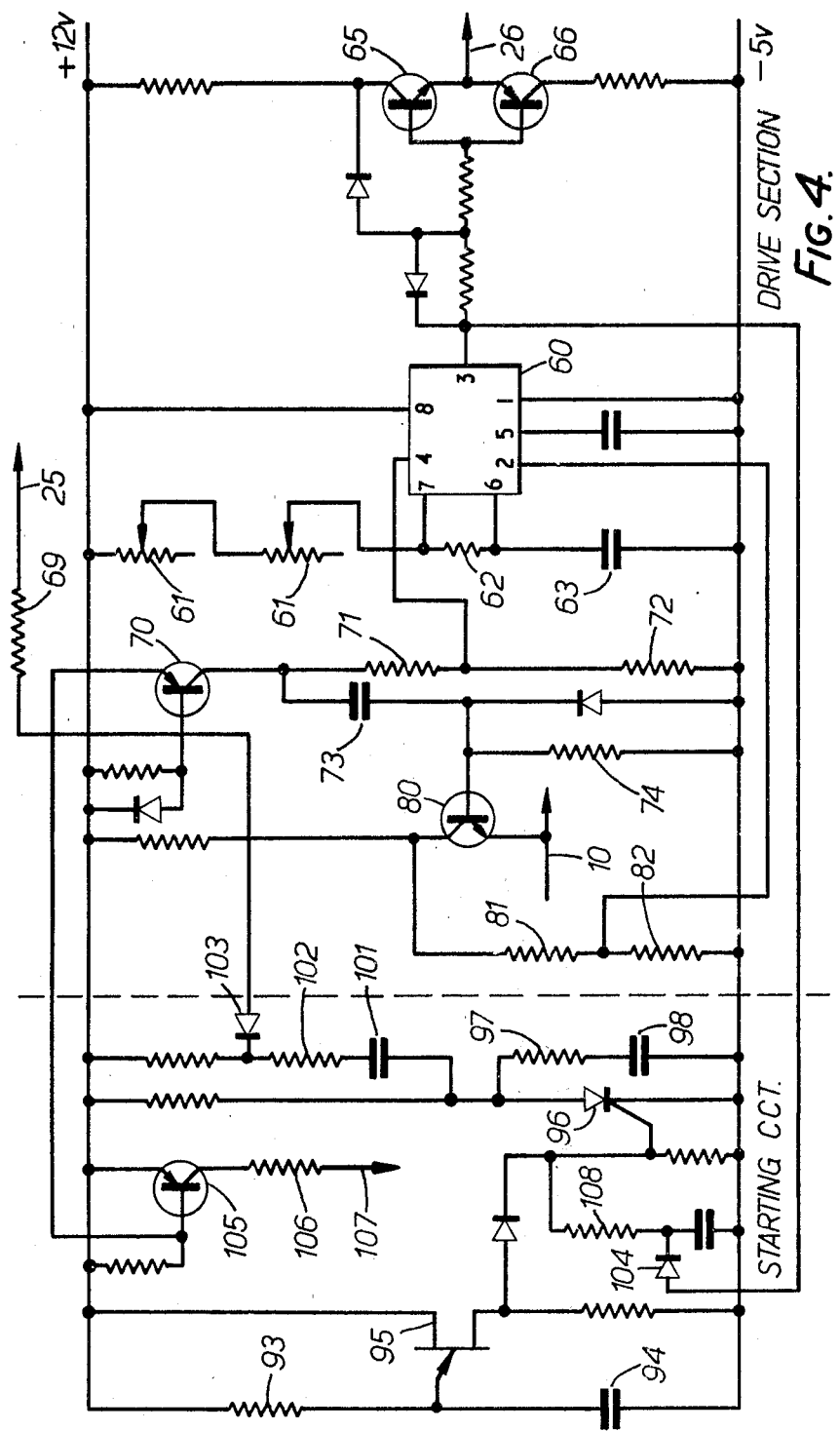

CONVERTERS

This invention relates to high-frequency converters. The invention is particularly applicable, although not limited, to converters incorporated in electric battery charging apparatus supplied from a mains supply. In the usual form of charger, if a step down or step up of voltage is required, a transformer is necessary and even where there is no change of voltage a transformer will generally be required to ensure isolation of the battery from direct connection to the mains supply. In the case of a high-power charger (e.g. tens of Kilowatts) the weight and bulk of a transformer for mains frequency will be very substantial, but if the frequency involved is increased to a supersonic value, for example 25 KHz, the weight and bulk are greatly reduced. In the case of a battery-driven vehicle this may make it practicable to carry the charger on the vehicle.

At the other end of the scale, even when working at low power levels, transformers, inductors or capacitors for frequencies of 50 or 60 Hz may be unacceptable in miniaturised equipment such as microprocessors.

Thus a well known system of such a converter, working in the so-called switching mode, employs one or more solid state switching devices (e.g. transistors) to connect a D.C. supply alternately in opposite directions at high frequency, through a high-frequency transformer and rectifier, to a load.

The present Applicant's prior U.S. Pat. Ser. Nos. 918,023 and 918,096, now U.S. Pat. Nos. 4,196,469 and 4,227,243 respectively, describe various arrangements providing a converter aimed at easing the duty on switching devices for a given output. In such arrangements the converter includes D.C. input supply terminals, a load circuit including a supersonic frequency transformer and an output rectifier, an oscillatory circuit including at least one capacitor and a parallel inductor connected in parallel with the primary winding of the transformer, and switching means including at least one solid state switching device which is synchronised to the oscillation of the oscillatory circuit to allow the circuit to oscillate freely for part of a cycle to transfer energy from the inductor to the capacitor to charge the latter to a certain condition in which the voltage across the parallel inductor is substantial and that across the switching device is negligible and only then connect the parallel inductor across the D.C. input terminals whereupon the parallel inductor receives and stores energy from the said supply.

An object of the present invention is to provide an efficient converter while further easing the duty on switching devices for a given output.

According to the invention the converter is characterised by means connected in series in the load circuit to restrict load current to a low value during a part of the cycle in which the capacitor receives energy from the parallel inductor and until the capacitor is charged to the said condition and the switching means has connected the load circuit across the supply.

Thus in a preferred push-pull arrangement the D.C. input supply is centre tapped and two solid state switching devices are connected in series across the D.C. input terminals, the load and parallel inductor being connected between the centre tapping of the supply and the junction of the solid state switching devices.

Preferably a diode is connected in parallel with the or each switching device. This enables the power to be regulated while the diode or diodes clamp the voltage across the switching device to a value little greater than that of the supply.

The invention is concerned with the problem that as the instantaneous input current to an output rectifier falls below its maximum value the inductance of the battery circuit or other output circuit causes virtually a short circuit of the load transformer which thus tends to rob the capacitor of the current from the parallel inductor thereby stopping oscillation.

In considering the reason for this it must be borne in mind that at high frequency such as 25 KHz the effect of quite small inductance is far more marked than at normal supply frequencies, for example 500 times that at 50 Hz. As described more fully below, when the instantaneous input voltage to the output rectifier changes sign the forward EMF in the inductance of the battery circuit tends to maintain current in the diode or diodes of both polarities, permitting input current to flow in either direction by increase of current in one diode accompanied by decrease of current in the companion diode, thus presenting a low impedance or short circuit to any current less than the average charging current.

The invention meets this problem by providing means for restricting load current until after the current charging the capacitor has fallen to zero.

In one form of the invention the load current restricting means comprise a series inductor connected in series with the load circuit. This may be satisfactory for certain loads but in general it has the disadvantage of adding to the impedance of the load circuit throughout the cycle. To overcome this disadvantage the load current restricting means may comprise a switching device connected in series with the load circuit but preferably it comprises a saturable reactor chosen to restrict load current to a low value while the capacitor receives energy from the parallel inductor but to be saturated and permit substantially greater load current during at least part of the cycle in which the load circuit receives energy from the supply.

The saturable series inductor may comprise a transductor, for example a pair of transformers having load windings connected in parallel, or a pair of transformers having load windings connected in series each shunted by one of a pair of diodes poled to conduct in opposite directions.

The control winding of such a transductor may be employed (instead of or in addition to means for varying the duty cycle of the power transistor or transistors) to regulate the output of the converter either manually or automatically in dependence on one or more parameters such as current, voltage or time.

In a circuit such as those described, in which current is passed through an inductor alternately in opposite directions, problems may arise due to lack of perfect symmetry, for example if the switching means feeds energy into the inductor in one direction for a slightly longer period than in the other direction, the difference of flux may build up progressively until the energy available in one direction is insufficient to maintain oscillation.

To meet this difficulty, in one form of the present invention the parallel inductor comprises two branches connected in parallel, each branch comprising an inductor connected in series with a diode, the diodes being poled to conduct in opposite directions.

Thus the current in each branch will always start from the same initial state and even if components or conditions are not precisely matched the difference of flux will not build up progressively.

This feature is not confined to those referred to above.

Thus according to a further aspect of the invention a convertor includes D.C. input supply terminals, an inductor unit, and a switching circuit including at least one solid-state switching device arranged to pass current alternately in opposite directions from the D.C. input terminals through the inductor unit, in which the inductor unit comprises two branches connected in parallel, each branch comprising an inductor connected in series with a diode, the diodes being poled to conduct in opposite directions.

The capacitor of the oscillatory circuit may be shunted by a resistor, and may be connected in series with a solid state switching device for starting oscillation.

The invention also embraces a battery charger incorporating the converter in combination with an input rectifier to supply it from an A.C. mains supply.

Further features and details of the invention will be apparent from the following description of certain specific embodiments that will be given by way of example with reference to the accompanying drawings, in which:

FIG. 4 is a circuit diagram of a synchronising and timing circuit for the arrangement of FIG. 3.

Figure 1:
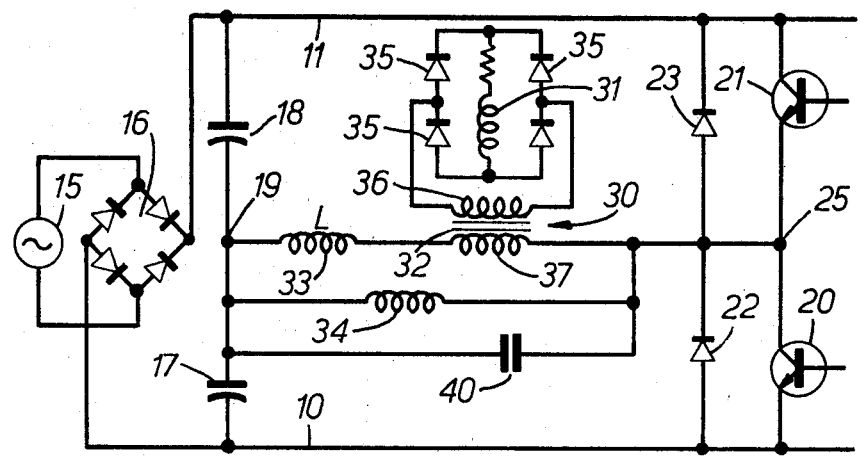
FIG. 1 is a schematic diagram of one form of power circuit embodying the invention, for a high-power 72 volt battery charger.

The arrangement of FIG. 1 comprises a D.C. supply having terminals 10 and 11 derived from an A.C. supply 15 through an input rectifier bridge 16. A pair of splitting capacitors 17 and 18 are connected in series across the supply terminals 10 and 11 to provide a centre tapping 19.

A pair of switching devices in the form of transistors 20 and 21 are also connected in series across the supply terminals 10 and 11.

The switching transistors 20 and 21 are shunted respectively by diodes 22 and 23.

A load circuit 30 is connected between the junction 25 of the transistors 20 and 21 and the centre tapping 19. The load circuit comprises a load 31 shown as an inductor and connected through a bridge rectifier 35 to the secondary winding 36 of a high frequency transformer 32 having its primary winding 37 connected in series with a series inductor 33. A parallel inductor 34 is connected in parallel with the primary winding 37 of the transformer and the series inductor 33.

A commutating capacitor 40 co-operates with the inductor unit to provide an oscillatory circuit. This may be connected as shown directly in parallel with the inductor unit.

Figure 2:
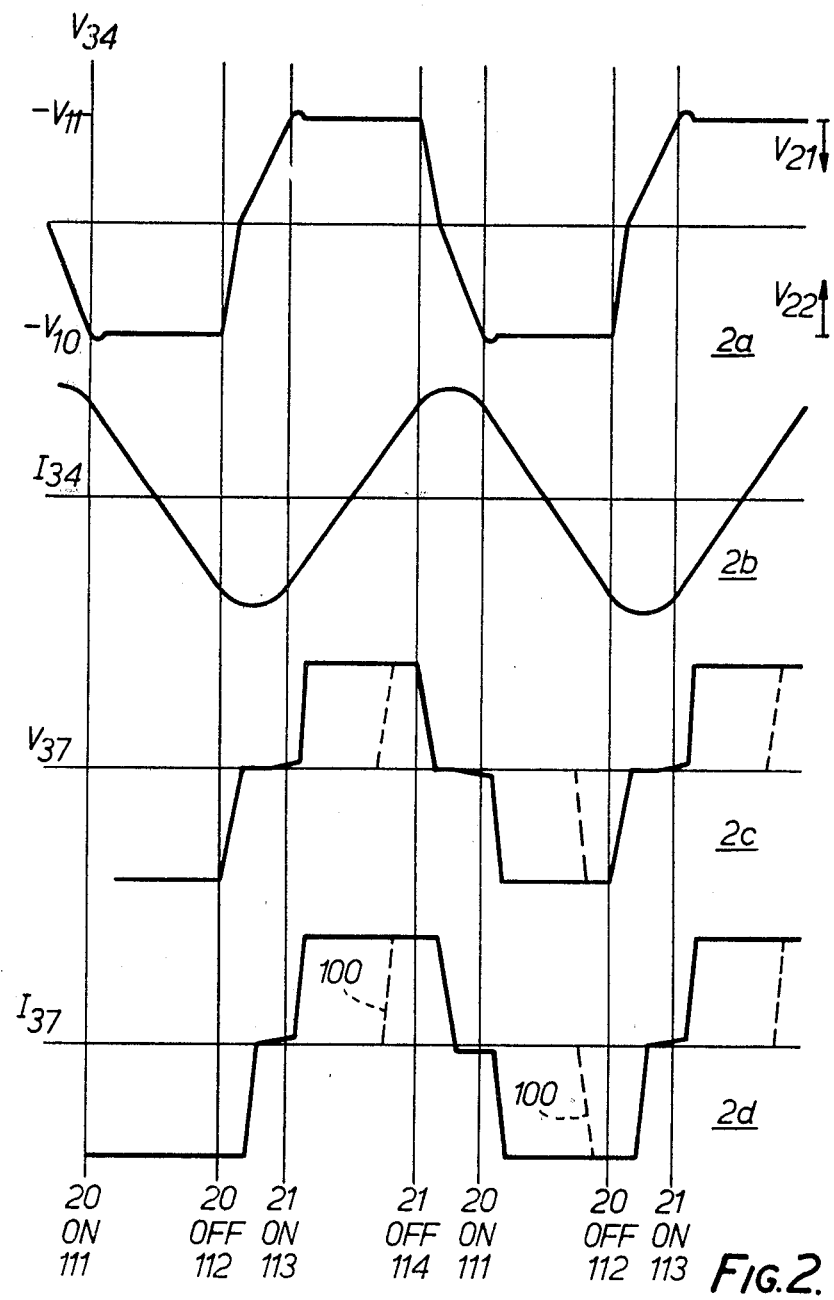
FIG. 2 is a set of diagrammatic graphs 2a, 2b, 2c and 2d respectively showing the general wave forms of parallel inductor voltage, parallel inductor current, primary load voltage, and load current.

The operation is generally as follows, occurring in cycles in each of which, as indicated in FIG. 2, the transistor 20 is switched on at a time 111, and switched off at a time 112, and then the transistor 21 is switched on at a time 113 and switched off at a time 114.

When the transistor 20 is switched on at time 111, it connects the inductor unit 30 directly across the d.c. supply represented by the splitting capacitor 17 so that the voltage of the point 25 is clamped to the voltage V10 of the supply terminal 10 from time 111 to time 112 as shown in graph 2a.

Meanwhile as shown in graph 2b, current rises substantially linearly in the inductor unit at a rate determined by the effective value of inductance and the voltage of the supply 17.

After a pre-set interval at time 112, the transistor 20 is switched off and the current flowing in the inductor unit is diverted to the commutating capacitor 40 and the potential at the point 25 rises substantially sinusoidally.

FIG. 2 illustrates the general wave form of the potential of the junction point 25 (details being exaggerated for clarity of description). Provided that the load 31 does not load the tuned circuit too heavily (beyond critical damping) the potential of the junction point 25 describes the path shown, executing part of a cycle of a free oscillation. The excursions of a free oscillation above and below the supply terminals 10 and 11 are clamped by the diodes 22 and 23.

The energy injected into and withdrawn from the circuit is dependent on two factors, namely the damping effect of the load and the energy fed into the system in the periods during which the transistors 20 and 21 conduct. This period is variable and under the control of a synchronising circuit so that the amplitude of oscillation can be controlled to take account of load and supply variations.

As soon as the potential of the point 25 rises above that of the positive supply terminal 11 i.e. at time 113, the diode 23 will conduct so as to limit the potential to very slightly above that of the said terminal. Thus the free oscillation proceeds until the energy of the parallel inductor 34 has been transferred to the commutating capacitor 40 (or to the supply). When the potential of the point 25 attains that of the positive supply terminal 11, i.e. at time 113, this is detected by the synchronising circuit and the transistor 21 is then switched on so as to clamp the potential of the point 25 to the positive supply terminal 11. Thus from time 113 to time 114 current builds up in the opposite direction in the parallel inductor 34 for a predetermined time in the same way as during the conducting period of the transistor 20 from time 111 to time 112. After this predetermined time the transistor 21 is switched off and the circuit executes a further part of a cycle of free oscillation.

The lower curves 2c and 2d of FIG. 2, show the wave form of load voltage and current and will be discussed in more detail below.

No reference has so far been made to the purpose of the series inductor 33 in series with the load represented by the primary winding of the transformer 32.

Thus when the transistor 20 turns off (at time 112) with the point 25 (and the corresponding terminal of the capacitor 40) charged to the voltage of the negative supply terminal 10, current will flow from the capacitor through the parallel inductor 34 and load circuit in parallel. Hence the rate of fall of voltage is approximately linear as these currents do not change very much during this short period.

When the capacitor has been discharged the intention is that the energy represented by the current in the parallel inductor should be transferred to it to charge it in the opposite direction (the point 25 positive) so that the voltage across the transistor 21 will be zero before it turns on.

As previously pointed out the effect of inductance at supersonic frequencies is very much more pronounced than at mains frequencies. Thus in a converter operating at supersonic frequency it will normally be necessary to regard the load circuit as possessing appreciable inductance as well as resistance (and as described below it may be desirable to increase its inductance).

The effect on an output rectifier of a load circuit possessing inductance is generally that of a freewheeling diode. Thus in the case of a bridge rectifier, as shown in FIG. 1, when the input current falls, any reduction of instantaneous load current induces a forward E.M.F. tending to maintain the load current constant, and as a result a freewheeling current will flow either in the diodes seen on the left in FIG. 1 or in those seen on the right, or in all four.

So long as a freewheeling current IB is flowing in the inductive output circuit, the input current can change from IB to the right to IB to the left merely by being redistributed between the diodes, from top left and bottom right to bottom left and top right, without in any way disturbing the freewheeling current in the inductive output circuit 31, and hence without requiring any appreciable voltage to effect the change.

On the other hand to charge the capacitor 40 a substantial current must be fed into it against a progressively rising voltage.

It will be seen that the primary load circuit is in parallel with the parallel inductor and with the capacitor, and if, as described above, the load circuit appears as a short circuit, it will (in the absence of the series inductor 33) rob the capacitor of charging current and stop oscillation.

One way of meeting this problem could be to increase the size of the parallel inductor 34, but this adds to the size of transistors needed to handle a given battery charging current. In addition the full value of parallel inductor current has to be switched even when the charging current is reduced.

A better method is to include the series inductor 33. This may be satisfactory for certain loads having a negative resistance characteristic, but for most loads it has the disadvantage of adding to the impedance of the load circuit throughout the cycle.

To overcome this disadvantage, in a preferred embodiment, the series inductor 33 is made saturable and is of substantial value so as to offer substantial impedance to load current when unsaturated, to prevent robbing the capacitor of charging current, but to be saturated and add negligible impedance to the load circuit when the latter is connected to the supply.

Thus in operation of this arrangement the series inductor is saturated while the transistor is ON (from time 111 to time 112) and the load is virtually in parallel with the parallel inductor and the capacitor 40.

Hence this portion of the graph 2c showing the voltage across the primary winding 37 is substantially the same as the corresponding portion of the graph 2a showing the total voltage across the load circuit (including the series inductor) the parallel inductor, and the capacitor.

When at time 112, the transistor 20 switches OFF, the load current I37 falls rapidly and the parallel inductor current I34 flows into the capacitor 40. When the load current I37 approaches zero, between times 112 and 113, the series inductor unsaturates and virtually disconnects the load circuit from the oscillatory circuit.

The latter comprising the capacitor 40 and parallel inductor 34, continues its free oscillation, the energy represented by the current in the parallel inductor 34 charging the capacitor 40 in the reverse direction (point 25 positive) and when it reaches the voltage of the positive supply terminal it triggers the transistor 21 ON at time 113 as shown in graphs 2a and 2b. When the series inductor unsaturates it offers high impedance to current in the primary circuit 37 but freewheel battery current can continue in the secondary or battery circuit. When the capacitor voltage reverses, a small magnetising current builds up through the series inductor, sufficient to saturate it, whenever the voltage is virtually all applied to the primary winding 37 of the transformer which represents a short circuit so long as freewheeling current is flowing. This however is immaterial for two reasons, first that this current is not now needed to charge the capacitor, and second that as the transistor 21 is now switched on the current is available from the supply. Accordingly the load current rapidly overtakes the freewheeling current and the output rectifier ceases to represent a short circuit.

It will be noted that the load current shown in graph 2d, approximates to a square wave but has sloping sides. Both these characteristics are favourable. A square wave has the advantage that roughly speaking the power handled depends on the area and is a maximum for a given overall height of wave, which represents the potential burden on the switching devices. At the same time a vertical-sided square wave is particularly unfavourable to a transistor since it tends to produce a condition of high dissipation in the switching device, namely high current at high voltage during the switching operation.

It should be noted that conduction of each transistor is only initiated when the voltage across it is zero or nearly so. This is determined by the synchronising circuit which may take any of a number of well known forms for example as described below with reference to FIG. 4. Furthermore at termination of conduction the rate of rise of voltage is determined by the charging time of the commutating capacitor 40 associated with the current flowing in the inductor unit. The high dissipation condition mentioned above is avoided.

Figure 3:
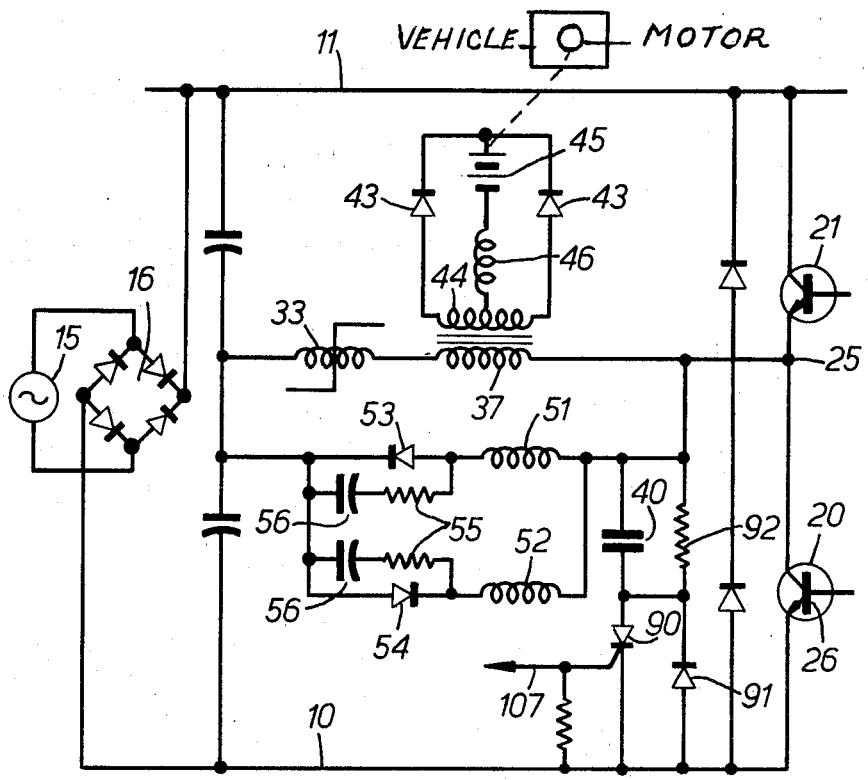
FIG. 3 is a schematic circuit diagram of a modified arrangement.

FIG. 3 shows an alternative arrangement incorporating certain modifications, either important or purely optional. The figure shows an arrangement, in which the commutating capacitor is connected effectively in parallel with the transistor 20, so that its voltage varies between zero and the supply voltage, rather than the symmetrical arrangement of FIG. 1 in which it is in parallel with the load circuit and parallel inductor and its voltage varies between plus and minus half the supply voltage between the terminals 10 and 11. At the frequency of the oscillatory circuit (conveniently some 25 KHz) the reactance of the splitting capacitor 17 is negligible. The arrangement of FIG. 3 is preferred in practice, that of FIG. 1 being included mainly for ease of description.

FIG. 3 also shows the output circuit comprising a centre tapped secondary winding 44 and two diodes 43 charging a battery 45. The operation is analogous to that of a bridge rectifier.

FIG. 3 also shows a 50 $\mu$H inductor 46 connected in series with the battery in the secondary circuit of the transformer. This introduces a considerable pedestal into the load current thus increasing the power converted for a given peak transistor current.

A further difficulty that was encountered was that the current in the parallel inductor had imposed upon it a steady sinusoidal oscillation typically of frequency in the region of 2 KHz, the amplitude of this oscillation gradually increasing with time so that eventually at the end of the charging period there might be too little energy in the parallel inductor to reverse the polarity of the commutating capacitor, and the 25 KHz oscillation would cease.

It has been found that changes in load current cause the power supply to become slightly unbalanced, thus imposing a bias on the inductor whose current then tended to become unidirectional over several cycles until differences in the supply capacity loadings caused them to correct, and then over-correct, thus causing oscillation.

In the arrangement of FIG. 3, in order to allow for lack of balance or symmetry of the circuit, the parallel inductor 34 is replaced by two branches, each branch comprising a small inductor 51 or 52 in series with a diode 53 or 54, the diodes being poled so as to conduct in opposite directions. If desired each diode may be snubbed by a series combination of a resistor 55 and capacitor 56. This arrangement ensures that there is a good supply of energy available to charge the commutating capacitor as the correct inductor will be conducting even if its current has been forced to zero unnaturally early.

FIG. 4 shows the synchronising and timing circuit for the power transistors 20 and 21 each of which may in practice be an array of a number of power transistors connected in parallel. Each power transistor is provided with a synchronising and timing circuit as shown in the right hand portion of FIG. 4, but only the transistor 20 is provided with a starting circuit as shown in the left hand portion of FIG. 4.

Each circuit is connected to a supply of 12 volts positive and 5 volts negative in relation to a zero potential represented by the emitter of the associated transistor 20 or 21 as the case may be. The connections of the circuit of FIG. 4 to that of FIG. 3 will be described as applied to the transistor 20, the circuit for the transistor 21 having similar connections to the emitter, base, and collector of the corresponding power transistor.

In each case the logic system detects the potential across its respective power transistor and provides a drive to turn it on when the voltage between its collector and emitter is low, and to turn it off again after a predetermined timed period to effect the wave forms generally as shown in FIG. 2.

The circuit incorporates an integrated circuit providing a timing device 60 whose timing period is initiated by a negative going pulse applied to its trigger pin numbered 2. The duration of the timing period is determined by a resistor capacitor network 61, 62, 63 connected to pins 6 and 7 of the integrated circuit. The output of the integrated circuit is from pin number 3 and is high throughout the timing period but otherwise low. Throughout the timing period the output is high turning on an ON transistor 65 and providing base drive to the base 26 of the corresponding power transistor 20. At the end of the timing period the pin number 3 becomes low, turning on an OFF transistor 66 and providing reverse base drive to the power transistor 20.

The output of the timer can be clamped in the low state by taking its reset pin number 4 to negative.

As indicated above each timed period begins when the potential difference between the collector and emitter of the associated power transistor falls to a low value. Thus the collector 25 of the transistor 20 is connected through a resistor 69 to the base of a transistor 70 whose collector circuit includes a potential divider 71, 72 whereof the tapping is connected to the reset pin 4 of the integrated circuit timer. Thus when the transistor 70 turns on it unclamps the timer.

In addition the collector circuit of the transistor 70 is connected to a capacitor resistor differentiating network 73, 74 whereof the junction is connected to the base of a transistor 80 whose emitter is connected to the zero volt connection 10, namely the emitter of the power transistor 20. The collector circuit of the transistor 80 is connected to a potential divider 81, 82 whereof the tapping is connected to the trigger pin 2 of the timer. Thus when the transistor 70 is turned on it also delivers a pulse to the transistor 80 which in turn delivers a negative pulse to the trigger pin of the timer so as to start a timing period.

At the end of this timing period the timer delivers reverse base drive to the power transistor 20 as described above and turns it off. The potential of the collector of the power transistor then rises in relation to its emitter as indicated in FIG. 2 and the timer is reset and clamped off so as to prevent spurious misfires.

A second timing and synchronising circuit connected to the power transistor 21 is similar to that described and operates in a similar manner during the next half cycle.

The power transistor 20 (but not the power transistor 21) is also provided with a starting circuit shown in the left hand portion of FIG. 4 controlling a thyristor 90 which as shown in FIG. 3 is connected in series with the commutating capacitor 40. The thyristor 90 has a diode 91 in parallel with it whilst the capacitor has a resistor 92 in parallel with it.

On the application of power the potential of the junction 25 is midway between those of the supply terminals 10 and 11 and both drive circuits are held quiescent. The thyristor 90 is off and the commutating capacitor 40 is discharged by the resistor 92. After a time delay introduced by a resistor-capacitor network 93, 94 a unijunction transistor 95 conducts and fires a thyristor 96 which is latched by a resistor 97 and capacitor 98. The rapidly falling potential at the anode of the thyristor 96 is applied to the base of the transistor 70 through a capacitor 101, a resistor 102, and a diode 103. This turns on the transistor 70 and as described above this initiates a timing period and turns on the power transistor 20.

The output pin 3 of the timer is also connected to the thyristor 96 through a diode 104 and resistor 108 and if oscillation is maintained this keeps the thyristor 96 in conduction; if oscillation ceases the thyristor 96 switches off and the sequence begins again.

To ensure that the thyristor 90 is gated on at the start and regated every cycle, a transistor 105 has its emitter-base circuit included in the connection of the transistor 70 to the positive rail. The collector of this transistor 105 is connected through a resistor 106 to the gate 107 of the thyristor 90 so as to turn on this device every time the potential at the junction 25 falls below 12 volts.

Various other components are shown in the circuit diagrams which are conventional or unimportant and which it is thought unnecessary to describe.

Figure 5:
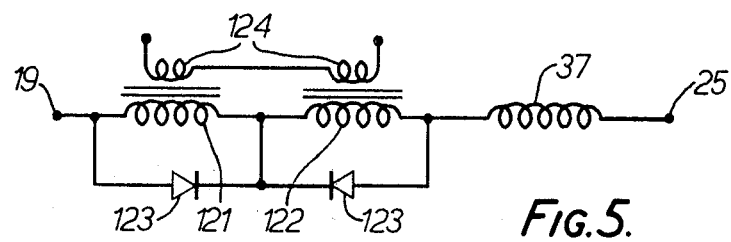
FIGS. 5, 6, and 7 are diagrams showing modifications to the circuits of FIGS. 1 and 3.

The timing of the conduction of the transistors 20 and 21 can be controlled by varying the timing periods of the timers by means of the resistors 61. Alternatively or in addition control can be effected by employing a transductor as the saturable series inductor 33. The transductor may take various known forms, for example as shown in FIG. 5 it may comprise a pair of transformers 121 and 122 with their load windings connected in series and each shunted by one of a pair of diodes 123 poled to conduct in opposite directions, and their bias windings so connected in series, that voltage across the load windings would provide no net voltage across the series connected bias windings. Alternatively their load windings may be connected in parallel.

Thus a current flowing in the bias or control windings 124 will cause one core to saturate sooner in one half cycle and the other to saturate sooner in the next half cycle. The inductor may be chosen to delay saturation to a maximum extent with no bias current flowing, so as to give the current shown by the dotted line 100 in FIG. 2d representing minimum power, while with the maximum bias current flowing the delay will be a minimum and the power a maximum as indicated in full lines in FIG. 2d.

Figure 6:
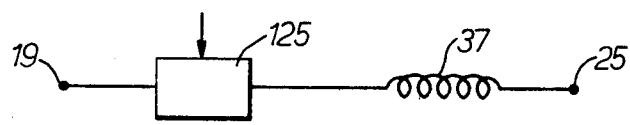

FIG. 6 shows how a controlled semi-conductor switch 125 could be used instead of the inductor 33.

Figure 7:
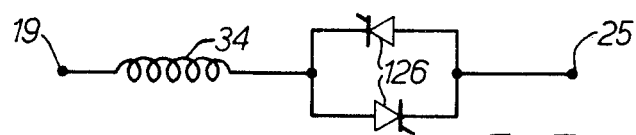
Figure 7B:
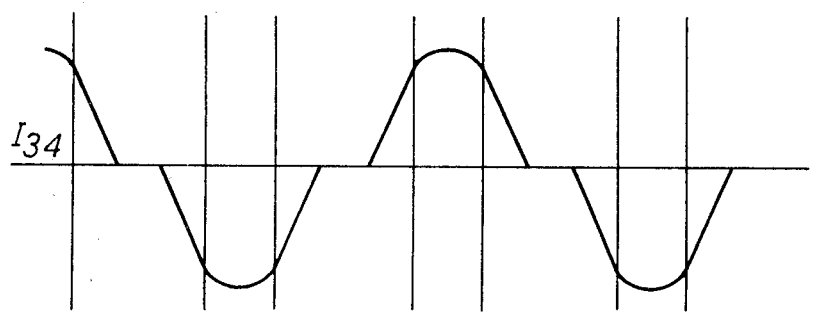

FIG. 7 shows an alternative to the arrangement of FIG. 3 with its two inductors 51 and 52 replacing the inductor 34 to compensate for unbalance. In FIG. 7 the inductor 34 is connected in series with a pair of back-to-back thyristors 126 which are fired to conduct in turn in dependence on the direction of current flow but to ensure that there is a short recovery period with neither conducting and zero current in the inductor. This prevents progressive build-up of unbalance currents and the current on the inductor would be as shown in FIG. 7b (corresponding to FIG. 2b).

What we claim as our invention and desire to secure by Letters Patent is:

1. A converter including D.C. input supply terminals, a load circuit including a high frequency transformer having primary and secondary windings, and an output rectifier, an oscillatory circuit including at least one capacitor and a parallel inductor connected in parallel with the primary winding of the transformer, and switching means including at least one solid state switching device, means for synchronizing the switching device to the oscillation of the oscillatory circuit for allowing the circuit to oscillate freely for part of a cycle to transfer energy from the inductor to the capacitor to charge the latter to a certain condition in which the voltage across the parallel inductor is substantial and that across the switching device is negligible and only then for connecting the parallel inductor across the D.C. input terminals whereupon the parallel inductor receives and stores energy from the said supply, and means connected in series in the load circuit for restricting load current to a low value during a part of the cycle in which the capacitor receives energy from the parallel inductor and until the capacitor is charged to the said condition and the switching means has connected the load circuit across the supply.

2. A converter as claimed in claim 1, in which the D.C. input supply is center tapped and including two solid state switching devices connected in series across the D.C. input terminals, the load and parallel inductor being connected between the center tapping of the supply and the junction of the solid state switching devices.

3. A converter as claimed in claim 1 or claim 2 in which a diode is connected in parallel with the or each solid state switching device.

4. A converter as claimed in claim 1 or claim 2 in which the load current restricting means comprise a series inductor connected in series with the load circuit.

5. A converter as claimed in claim 1 in which the load current restricting means comprise a saturable reactor designed to be saturated and permit substantially greater load current to flow during at least part of the cycle in which the load circuit receives energy from the supply.

6. A converter as claimed in claim 5 in which the saturable reactor comprises a transductor.

7. A converter as claimed in claim 6 in which the transductor comprises a pair of transformers having load windings connected in series each shunted by one of a pair of diodes poled to conduct in opposite directions.

8. A converter as claimed in claim 7 in which the transformers include respective transformer bias windings which are connected in series and in series with a source of a control signal.

9. A converter as claimed in claim 1 or claim 2 in which the load current restricting means comprise a switching device connected in series with the load circuit.

10. A converter as claimed in claim 1 or claim 2 in which the parallel inductor circuit comprises two branches in parallel each comprising a rectifier, the rectifiers being poled to conduct in opposite directions.

11. A converter as claimed in claim 1 in which the resonance frequency of the oscillatory circuit is supersonic.

12. A converter including D.C. input supply terminals an inductor unit including at least one inductor and two branches connected in parallel, each branch comprising a rectifier, the rectifiers being poled to conduct in opposite directions, a switching circuit including at least one solid-state switching device for causing current to pass alternately in opposite directions from the D.C. input terminals through the inductor, and means for preventing current flowing in a, or the, inductor during a period when the direction of current flow in the inductor is changing.

13. A converter as claimed in claim 12 in which each rectifier is connected in series with one inductor and in parallel with a capacitor and resistor in series.

14. A converter as claimed in claim 12 in which a single inductor is connected in series with the parallel branches, including means for controlling the rectifiers so that there is a no-current period after one has conducted and before the other conducts.

15. A battery charger incorporating a converter as claimed in claim 1 or claim 12 in combination with an input rectifier to supply it from an A.C. mains supply.

* * * * *